(12) United States Patent
Tsirkin et al.

(10) Patent No.: US 10,572,289 B2
(45) Date of Patent: Feb. 25, 2020

(54) GUEST-INITIATED ANNOUNCEMENT OF VIRTUAL MACHINE MIGRATION

(71) Applicant: Red Hat Israel, Ltd., Raanana (IL)

(72) Inventors: Michael Tsirkin, Westford, MA (US); Amnon Ilan, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 163 days.

(21) Appl. No.: 15/687,865

(22) Filed: Aug. 28, 2017

(65) Prior Publication Data

US 2019/0065228 A1 Feb. 28, 2019

(51) Int. Cl.
*G06F 9/455* (2018.01)

(52) U.S. Cl.
CPC .. *G06F 9/45558* (2013.01); *G06F 2009/4557* (2013.01); *G06F 2009/45575* (2013.01); *G06F 2009/45583* (2013.01); *G06F 2009/45595* (2013.01)

(58) Field of Classification Search
CPC ... G06F 2009/4557; G06F 2009/45575; G06F 2009/45583; G06F 9/4856
See application file for complete search history.

(56) References Cited

U.S. PATENT DOCUMENTS

| | | | |
|---|---|---|---|
| 8,468,288 B2 | 6/2013 | Corry et al. | |
| 8,635,318 B1 * | 1/2014 | Shankar | H04L 41/085 709/205 |
| 8,819,678 B2 | 8/2014 | Tsirkin | |
| 8,910,160 B1 * | 12/2014 | Patwardhan | G06F 9/4856 718/1 |
| 9,110,702 B2 | 8/2015 | Reuther et al. | |
| 9,348,655 B1 | 5/2016 | Tsirkin et al. | |
| 9,459,900 B2 | 10/2016 | Tsirkin | |
| 9,529,636 B2 | 12/2016 | Oshins | |
| 9,639,388 B2 | 5/2017 | Tsirkin et al. | |
| 2010/0322255 A1 * | 12/2010 | Hao | G06F 9/45558 370/398 |
| 2012/0110181 A1 * | 5/2012 | Tsirkin | G06F 9/4856 709/226 |
| 2012/0233282 A1 * | 9/2012 | Voccio | G06F 9/461 709/212 |

(Continued)

OTHER PUBLICATIONS

Hines, Michael et al., "Post-Copy Live Migration of Virtual Machines", Computer Science, Binghamton University (SUNY), https://kartikgopalan.github.io/publications/hines09postcopy_osr.pdf, Mar. 2009, 13 pages.

(Continued)

*Primary Examiner* — Dong U Kim
(74) *Attorney, Agent, or Firm* — Lowenstein Sandler LLP

(57) ABSTRACT

Systems and methods for implementing guest-initiated announcement of virtual machine migration. An example method may comprise: receiving, by an origin hypervisor running on an origin computer system, a migration announcement of a virtual machine; copying at least a part of a state of the virtual machine to a destination computer system; and responsive to stopping the virtual machine on the origin computer system, causing a destination hypervisor running on the destination computer system to broadcast the migration announcement over a network associated with the destination computer system.

20 Claims, 7 Drawing Sheets

(56) References Cited

U.S. PATENT DOCUMENTS

2015/0212844 A1\* 7/2015 Tsirkin ................ G06F 9/45558
 718/1
2015/0370596 A1 12/2015 Fahs et al.
2016/0062779 A1\* 3/2016 Tsirkin .................. G06F 9/4856
 718/1

OTHER PUBLICATIONS

Hou, Kai-Yuan et al., "Application-Assisted Live Migration of Virtual Machines with Java Applications", University of Michigan, Oracle America, Inc., https://kabru.eecs.umich.edu/wordpress/wp-content/uploads/EuroSys2015-paper110-final-camera-ready.pdf, Apr. 21-24, 2015, 15 pages.

\* cited by examiner

| 210 Hardware type | 212 Protocol type | 214 Operation code | 216 Source Hardware Address | 218 Source Protocol Address | 220 Target Hardware Address | 222 Target Protocol Address |

FIG. 2

GUEST-INITIATED ANNOUNCEMENT OF VIRTUAL MACHINE MIGRATION

TECHNICAL FIELD

The present disclosure is generally related to virtualized computer systems, and is more specifically related to systems and methods for guest-initiated announcement of virtual machine migration.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table for translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates an example structure of a migration announcement that may be prepared by the virtual machine, in accordance with one or more aspects of the present disclosure;

DETAILED DESCRIPTION

Figure 1:
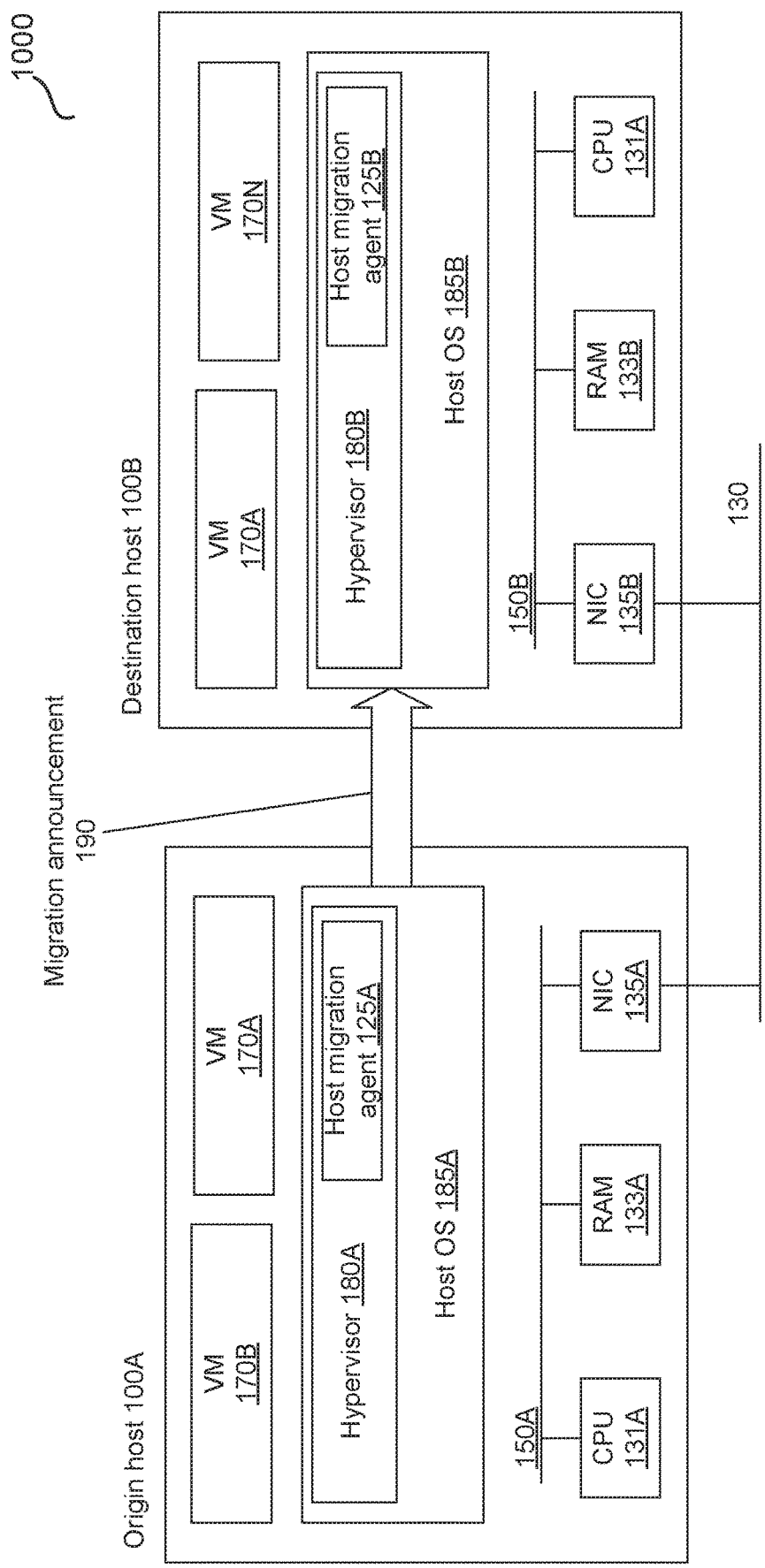
FIG. 1 depicts a high-level component diagram of one illustrative embodiment of a distributed computer system in accordance with one or more aspects of the present disclosure.

Described herein are methods and systems for implementing guest-initiated announcement of virtual machine migration. "Live migration" herein refers to the process of moving a running virtual machine from an origin host computer system to a destination host computer system without disrupting the guest operating system and the applications executed by the virtual machine. Live migration may involve copying the virtual machine execution state from the origin host to the destination host. The virtual machine execution state may comprise the memory state, the virtual processor state, the virtual devices state, and/or the network connectivity state.

In certain implementations, the origin host may initiate the virtual machine migration by performing the warm-up phase, which involves copying the state of the virtual machine to the destination host while the virtual machine is still running at the origin host. Upon substantially completing the virtual machine state copying, the origin host may stop the virtual machine execution and notify the destination host of completion of the warm-up migration phase.

The destination host may then initiate the post-copy migration phase, by resuming the virtual machine and requesting, in due course, the remaining memory pages to be transmitted by the origin host (e.g., responsive to intercepting a page fault with respect to one of the memory pages that has not yet been transferred to the destination host).

While Open Systems Interconnection (OSI) data link layer (Layer 2) addresses (which may be represented, e.g., by media access control (MAC) addresses) and OSI network layer (Layer 3) addresses (which may be represented, e.g., by Internet protocol (IP) addresses) associated with one or more network interfaces of the migrating virtual machine may be unaffected by the migration to the destination host, the network configurations of at least some Layer 2 devices that are coupled to the source and destination networks would have to be modified in order to reflect the virtual machine migration. In an illustrative example, the physical network interfaces of the destination host may be coupled to switch ports that are different from the switch ports servicing the physical network interfaces of the source host. Therefore, the Layer 2 switch would need to update its internal data structures mapping Layer 2 and/or Layer 3 addresses of the migrating virtual machine to switch ports which are coupled to the respective host interfaces. Other examples of affected Layer 2 devices may include Layer 2 bridges, Layer 3 routers, and other network devices that perform switching, routing, and/or tracking of network packets that are originated by and/or addressed to the migrating virtual machine.

In certain implementations, upon resuming the virtual machine, an announcement reflecting the updated network configuration of the virtual machine may be broadcast, in order to trigger the re-configuration of the affected Layer 2 and/or Layer 3 network devices. In an illustrative example, the destination hypervisor may broadcast an announcement of Layer 2 addresses associated with one or more virtual network interfaces of the virtual machine. However, the announcement initiated by the destination hypervisor may not always reflect all the aspects of the virtual machine network configuration (e.g., Layer 3 addresses associated with the virtual network interfaces). In another illustrative example, the guest operating system running on the virtual machine may broadcast an announcement of Layer 2 and Layer 3 addresses associated with one or more virtual network interfaces of the virtual machine. However, while correctly reflecting the virtual machine network configuration, transmitting the announcement by the virtual machine during the warm-up migration phase may be hindered by the fact that the virtual machine may be operating at a slow rate due to the relatively large number of page faults with respect to the memory pages which have not yet been transferred from the origin host.

Furthermore, in both above-described scenarios, the migration announcement is only broadcast after the virtual machine is restarted at the destination host. Therefore, any network packets addressed to the network packets that have reached an affected Layer 2 and/or Layer 3 network device (e.g., a network switch) before the announcement will be delivered to the origin host. A network packet arriving at the origin host after the virtual machine has already been stopped would be dropped, which may interfere with some protocols which are not well equipped for handling dropped packets.

The present disclosure alleviates the above-noted and other deficiencies by providing systems and methods for transmitting guest-initiated announcements of virtual machine migration. In accordance with one or more aspects of the present disclosure, an announcement reflecting the virtual machine network configuration may be prepared by the guest (e.g., by a driver or an application running under the guest operating system) before the migration starts (e.g., upon configuring the guest network stack or upon receiving a message indicating an imminent migration).

The migration announcement may comprise a Layer 2 address associated with a virtual network interface of the virtual machine, a Layer 3 address associated with the virtual network interface, and/or a virtual local area network (VLAN) identifier associated with the virtual network interface.

The guest may store the announcement in a guest memory buffer and notify the hypervisor of the buffer address. The guest may further modify the announcement after it has been stored in the memory buffer, in order to reflect eventual modifications to the virtual machine network configuration which may have occurred after the initial announcement has been stored in the memory buffer but before the migration start. After stopping the virtual machine at the origin, the origin hypervisor may notify the destination hypervisor of the location of the announcement packets in the guest memory. Assuming that guest networking modifications happen infrequently with respect to the rate of transfer of guest memory pages to the destination host, the memory pages containing the announcement packets would be transferred to the destination host during the warm-up phase (i.e., before the virtual machine is stopped at the origin). The destination hypervisor may then retrieve the announcement packets and broadcast them over the affected network.

Since the announcement packets are likely to be transferred to the destination host by the time the destination hypervisor is notified of their location in the guest memory, the destination hypervisor will not, most likely, need to retrieve the memory pages from the source, thus allowing for broadcasting the announcement with minimal latency even if the virtual machine itself is blocked waiting on one or more memory pages to be transferred from the source during the post-copy migration phase. In certain implementations, the migration announcement may be repeatedly broadcast by the destination hypervisor to ensure that the announcement has been successfully received by all affected network devices.

Responsive to receiving the migration announcement, one or more Layer 2 and/or Layer 3 network devices may update its internal data structures mapping Layer 2 and/or Layer 3 addresses of the migrating virtual machine to switch ports which are coupled to the respective host interfaces.

Various aspects of the above referenced methods and systems are described in details herein below by way of examples, rather than by way of limitation.

FIG. 1 depicts a high-level component diagram of one illustrative example of a distributed computer system 1000 comprising host computer systems 100A, 100B in accordance with one or more aspects of the present disclosure. "Computer system" herein shall refer to a system comprising one or more processors, one or more memory devices, and one or more input/output (I/O) interfaces. "Distributed computer system" herein shall refer to a system comprising two or more computer systems interconnected by one or more communication networks.

In the illustrative example of FIG. 1, the host computer systems 100A and 100B may be interconnected via a network 130. Each host computer system 100A, 100B may comprise one or more processors 131A-131B communicatively coupled to memory devices 133A-133B and network interface controllers (NICs) 135A-135B. Local connections within host computer system 100, including connections between the processor 131, the memory device 133, and th NIC 135, may be provided by one or more local buses 150A-150B of a suitable architecture.

"Processor," "central processing unit" (CPU), or "processing device" herein refers to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory device" herein refers to a volatile or non-volatile memory device, such as random access memory (RAM), read-only-memory (ROM), electrically-erasable programmable read-only memory (EEPROM), or any other device capable of storing data.

"Input/output (I/O) device" herein refers to a device capable of providing an interface between a processor and an external device capable of inputting and/or outputting binary data.

"Network interface controller" (NIC) herein refers to a computer hardware component that connects a computer to a computer network. A NIC may comprise electronic circuitry required to communicate with other networked devices using specific physical layer and data link layer standards.

In the illustrative example of FIG. 1, each host computer system 100A-100B may run multiple virtual machines 170A-170N by executing a software layer 180, often referred to as "hypervisor," above the hardware and below the virtual machines. In certain implementations, the hypervisor 180 may be a component of the host operating system 185. Alternatively, the hypervisor 180 may be provided by an application running under the host operating system 185, or may run directly on the respective host computer system 100 without an operating system beneath it. The hypervisor 180 may abstract the physical layer, including processors, memory, and I/O devices, and present this abstraction to the virtual machines 170 as virtual devices, including virtual processors, virtual memory, and virtual I/O devices. Host migration agents 125A, 125B running on the respective host computer system 100A, 100B may perform virtual machine migration management functions in accordance with one or more aspects of the present disclosure. In certain implementations, a host migration agent may be implemented as a software component invoked by hypervisor 180. Alternatively, the functions of host migration agent 125 may be performed by hypervisor 180.

The host computer system 100A-100B may implement a virtual memory system where pages of an address space of a process or a virtual machine are mapped to the physical memory. The address space virtualization may be handled through the processor's paging mechanism. Paging may support a virtual memory environment where a large linear address space is simulated with a smaller amount of random access memory (RAM) and some disk storage. Each memory segment may be divided into pages of a defined size (e.g., 4 KB) which may be stored either in RAM or on the disk. The operating system may maintain a page directory and a set of page tables to keep track of the pages. When a process attempts to access an address location in the linear address space, the processor may use the page directory and page tables to translate the linear address into a physical address. If the page being accessed is not currently in physical memory (as indicated by the state of the "present" bit flag in the page table entry associated with the memory page), the processor may generate a page fault exception, and the operating system may then read the page from the disk and continue executing the thread. The processor may also generate a page fault exception if the memory page being accessed is write-protected (as indicated by the state of the "write-protected" bit flag in the page table entry associated with the memory page).

In accordance with one or more aspects of the present disclosure, the virtual machine 170A (e.g., by a driver or an application running under the guest operating system) may prepare an announcement reflecting the virtual machine network configuration (e.g., upon configuring the guest network stack or upon receiving from the hypervisor a message indicating an imminent migration). The migration announcement may comprise a Layer 2 address associated with a virtual network interface 135A of the virtual machine 170A, a Layer 3 address associated with the virtual network interface 135A, and/or a virtual local area network (VLAN) identifier associated with the virtual network interface 135A. In an illustrative example, a VLAN identifier associated with the virtual network interfaces 135 of the virtual machine 170A may be provided by a 32-bit field inserted between the source MAC address and the EtherType/length fields of the original Ethernet frame.

A virtual machine having two or more virtual network interfaces may prepare two or more migration announcements, each migration announcement corresponding to the respective virtual network interface.

The virtual machine 170A may store the prepared migration announcement in a memory buffer residing in the guest memory and notify the hypervisor 180A of the buffer address. The virtual machine 170A may further modify the prepared announcement, in order to reflect eventual modifications to the virtual machine network configuration which may have occurred after the initial announcement has been stored in the memory buffer. In certain implementations, a virtual machine having two or more virtual network interfaces may prepare two or more migration announcements, such that each migration announcement would correspond to the respective virtual network interface.

FIG. 2 schematically illustrates an example structure of a migration announcement that may be prepared by the virtual machine 170A, in accordance with one or more aspects of the present disclosure. The migration announcement may comprise a "Request Reverse" message (operation code=3) of the Reverse Address Resolution Protocol (RARP). Message 200 may comprise hardware type field 210, protocol type field 212, and operation code field 214. Message 200 may further comprise source hardware address 216 and source protocol address 218 fields. Message 200 may further comprise target hardware address 220 and target protocol address 222 fields. Message 200 may further comprise other fields that are not shown in FIG. 2 for clarity and conciseness.

In certain implementations, the virtual machine 170A may initialize hardware type field 210 with the value identifying Ethernet networks, protocol type field 212 with the value identifying RARP, and operation code field with the value identifying RARP "Request Reverse" message. The virtual machine 170A may further initialize source hardware address 216 and target hardware address fields 220 with the Layer 2 address of the virtual network interface 135A of virtual machine 170A. The virtual machine 170A may further initialize source protocol address 218 and target protocol address fields 222 with the network layer address assigned to the virtual network interface 135A of virtual machine 170A.

Referring again to FIG. 1, the origin host 100A (e.g., by the host migration agent 125A) may, in due course, initiate migration of the virtual machine 170A to the destination host 100B by performing the warm-up phase, which involves copying the state of the virtual machine 170A to the destination host 100B while the virtual machine 170A is still running at the origin host 100A. During the warm-up phase, the origin host 100A may iteratively re-copy to the destination host 100B the state that has been modified, or became "dirty," during the state copying operation, as may be indicated by the "dirty" bit flag of the page table entry associated with the corresponding memory page. Upon substantially completing the virtual machine state copying (which may be evidenced by meeting a migration convergence condition), the origin host 100A may stop the virtual machine 170A and notify the destination host 100B of completion of the warm-up migration phase. In various illustrative examples, the migration convergence condition may be represented by the memory pages "dirtying" rate (reflected, e.g., by the size of the memory pages which became "dirty" since the start of the last copying operation or within a unit of time) falling short of a pre-defined threshold rate, the memory pages "dirtying" rate falling short of the virtual machine state transfer rate, or the memory pages "dirtying" rate falling short of the network throughput.

Responsive to completing the warm-up migration phase and stopping the virtual machine 170A, the origin hypervisor 180A may notify the destination hypervisor 180B of the location of the announcement packets in the guest memory. Assuming that guest networking modifications happen infrequently with respect to the rate of transfer of guest memory pages to the destination host, the memory pages containing the announcement packets would be transferred to the destination host during the warm-up phase (i.e., before the virtual machine is stopped at the origin).

Responsive to receiving a notification of the warm-up phase completion by the origin host 100A, the destination host 100B may retrieve the announcement packets from the memory buffer and broadcast them over the affected network. Since the announcement packets are likely to be transferred to the destination host 100B by the time the destination hypervisor 180B is notified of their location in the guest memory, the destination hypervisor 180B will not, most likely, need to retrieve the memory pages from the source host 100A, thus allowing for broadcasting the announcement with minimal latency even if the virtual machine 170A is blocked waiting on one or more memory pages to be transferred from the origin host 100A during the post-copy migration phase. In certain implementations, the migration announcement may be repeatedly transmitted by the destination hypervisor to a broadcast or multicast address to ensure that the announcement has been successfully received by all affected network devices. The number and frequency of such transmissions may be configurable based on the configuration of the network 130 to which the host computer system 100B is connected. In certain implementations, the destination hypervisor 180B may broadcast two or more migration announcements for a virtual machine having two or more virtual network interfaces, such that each migration announcement would correspond to the respective virtual network interface.

Responsive to receiving the migration announcement, one or more Layer 2 and/or Layer 3 network devices may update its internal data structures mapping Layer 2 and/or Layer 3 addresses of the migrating virtual machine to switch ports which are coupled to the respective host interfaces.

Figure 3:
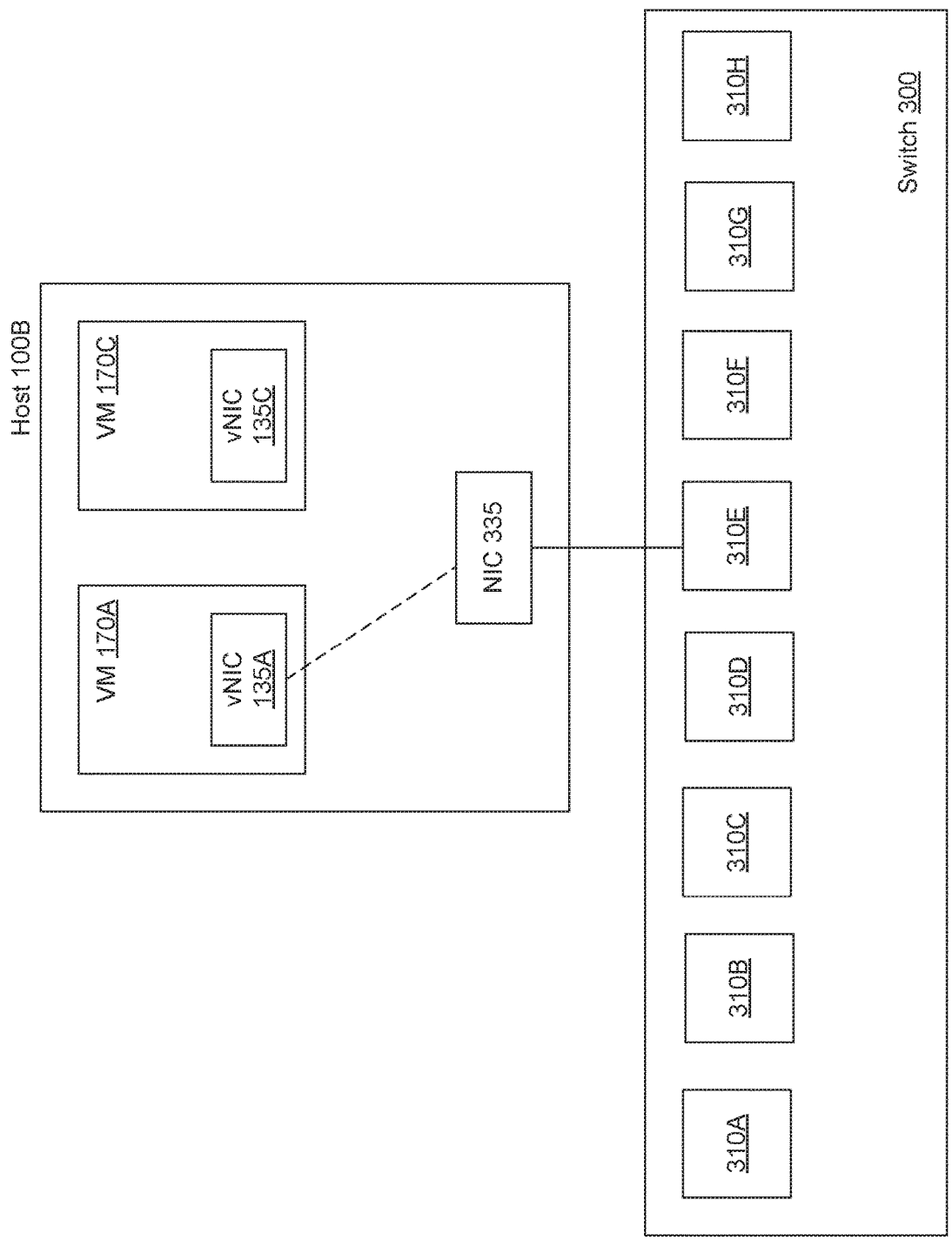
FIG. 3 schematically illustrates a Layer 2 switch that may receive and process a virtual machine migration announcement, in accordance with one or more aspects of the present disclosure.

FIG. 3 schematically illustrates a Layer 2 switch that may receive and process a virtual machine migration announcement, in accordance with one or more aspects of the present disclosure. In the illustrative example of FIG. 3, the switch 300 may associate (e.g., by an entry in a memory data structure) the data link layer address of the virtual network interface 135A of the virtual machine 170A and switch port 310E through which a migration announcement comprising the data link layer address of the virtual network interface 135A has been received. In certain implementations, the switch 300 may further associate (e.g., by an entry in the memory data structure) one or more VLANs associated with the virtual network interface 135A of the virtual machine 170A and switch port 310E through which a migration announcement comprising the data link layer address of the virtual network interface 135A has been received.

Referring again to FIG. 1, responsive to receiving a notification of the warm-up phase completion by the origin host 100A, the destination host 100B may further initiate the post-copy migration phase, by resuming the virtual machine 170A. In the post-copy migration phase, the destination hypervisor 180B may invalidate the page table entries corresponding to the memory pages that have not yet been copied from the origin host (e.g., by clearing the "valid" bit of the page table entries corresponding to the affected memory pages). Therefore, an attempt by the virtual machine 170A to access a memory page which has not yet been transferred from the origin host 100A would result in a page fault. Upon intercepting the page fault, the destination hypervisor 180B may cause the memory page content be transferred to the destination host 100B, after which the virtual machine 170B may be resumed.

Figure 4:
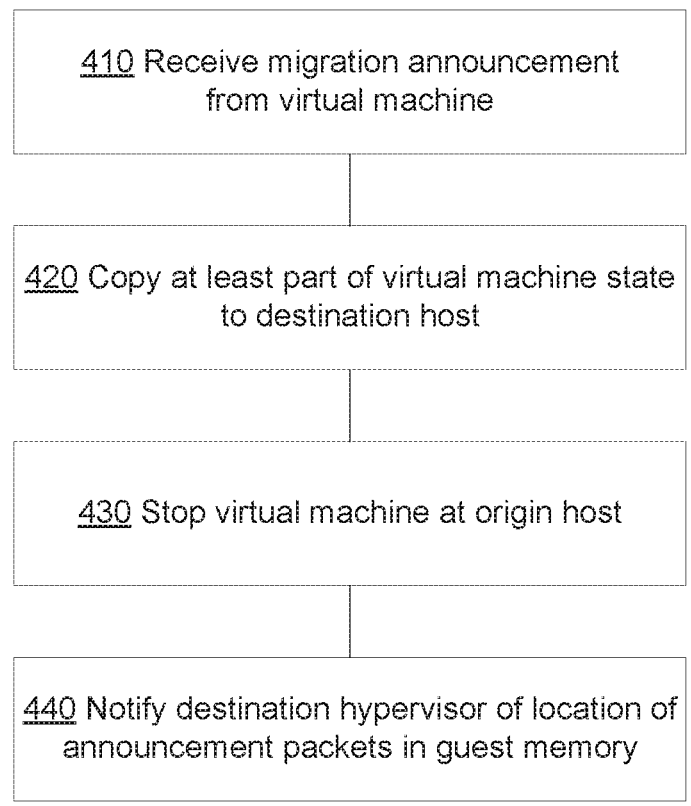
FIG. 4 depicts a flow diagram of an example method for implementing guest-initiated announcement of virtual machine migration by the origin hypervisor, in accordance with one or more aspects of the present disclosure.

FIG. 4 depicts a flow diagram of an example method 400 for implementing guest-initiated announcement of virtual machine migration by the origin hypervisor, in accordance with one or more aspects of the present disclosure. Method 400 may be performed by a computer system that may comprise hardware (e.g., circuitry, dedicated logic, and/or programmable logic), software (e.g., instructions executable on a computer system to perform hardware simulation), or a combination thereof. Method 400 and/or each of its individual functions, routines, subroutines, or operations may be performed by one or more processors of the computer system executing the method (e.g., computer system 100A of FIG. 1). In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. In an illustrative example, method 400 may be implemented by a hypervisor running on an origin computer system and managing a virtual machine to be migrated to a destination computer system.

At block 410, the origin hypervisor may receive, from a virtual machine running on the origin host, a migration announcement of the virtual machine. As noted herein above, the migration announcement may be prepared by the virtual machine (e.g., by a driver or an application running under the guest operating system) before the migration starts (e.g., upon configuring the guest network stack or upon receiving a message indicating an imminent migration), and may be further modified by the guest to reflect eventual modifications to the virtual machine network configuration which may have occurred after the initial announcement has been stored in the memory buffer. The migration announcement may comprise a Layer 2 address associated with a virtual network interface of the virtual machine, a Layer 3 address associated with the virtual network interface, and/or a virtual local area network (VLAN) identifier associated with the virtual network interface. The virtual machine may store the announcement in a buffer residing in the guest memory and notify the hypervisor of the buffer address, as described in more detail herein above.

At block 420, the origin hypervisor may perform the warm-up phase of migrating the virtual machine to the destination host, which may involve copying at least a part of a state of the virtual machine to the destination host, as described in more detail herein above.

Upon substantially completing the virtual machine state copying (which may be evidenced by meeting a migration convergence condition), the origin hypervisor may, at block 430, stop the virtual machine, as described in more detail herein above.

At block 440, the origin hypervisor may notify the destination hypervisor of the location of the announcement packets in the guest memory, thus causing the destination hypervisor to retrieve the announcement packets and broadcast them over the network associated with the destination host, in order to trigger the re-configuration of the affected Layer 2 and/or Layer 3 network devices, such as Layer 2 bridges, Layer 3 routers, and other network devices that perform switching, routing, and/or tracking of network packets that are originated by and/or addressed to the migrating virtual machine, as described in more detail herein above. Responsive to completing operations described with reference to block 450, the method may terminate.

Figure 5:
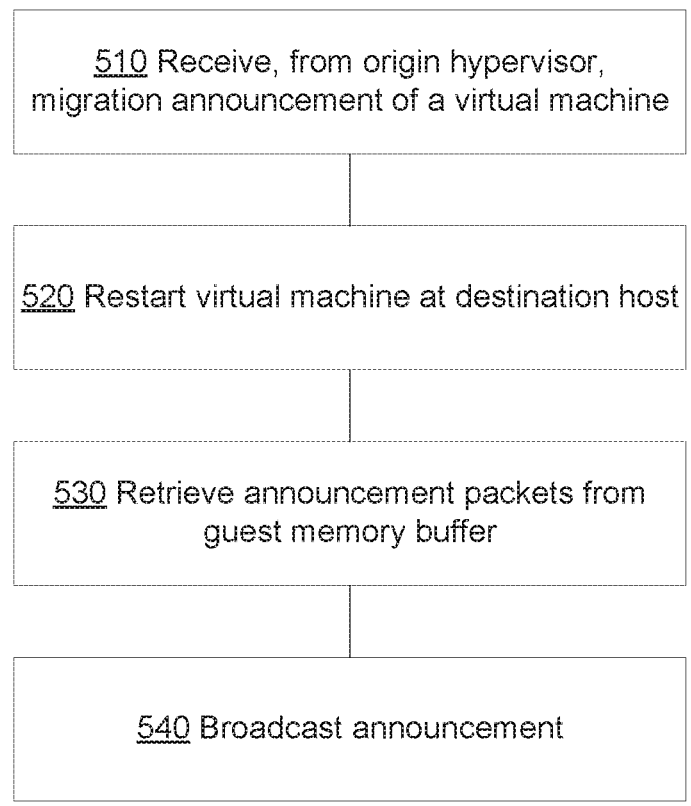
FIG. 5 depicts a flow diagram of an example method for implementing guest-initiated announcement of virtual machine migration by the destination hypervisor, in accordance with one or more aspects of the present disclosure.

FIG. 5 depicts a flow diagram of an example method 500 for implementing guest-initiated announcement of virtual machine migration by the destination hypervisor, in accordance with one or more aspects of the present disclosure. Method 500 may be performed by a computer system that may comprise hardware (e.g., circuitry, dedicated logic, and/or programmable logic), software (e.g., instructions executable on a computer system to perform hardware simulation), or a combination thereof. Method 500 and/or each of its individual functions, routines, subroutines, or operations may be performed by one or more processors of the computer system executing the method (e.g., computer system 100A of FIG. 1). In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. In an illustrative example, method 500 may be implemented by a hypervisor running on the destination computer system to which a virtual machine has been migrated.

At block 510, the destination hypervisor may receive, from the origin hypervisor, a notification of completion of a warm-up phase of migrating a virtual machine to the destination host. The notification may comprise an identifier of a memory buffer storing a migration announcement of the virtual machine. The migration announcement may comprise a Layer 2 address associated with a virtual network interface of the virtual machine, a Layer 3 address associated with the virtual network interface, and/or a virtual local area network (VLAN) identifier associated with the virtual network interface, as explained in more detail herein above.

At block 520, the destination hypervisor may perform the post-copy migration phase, which may involve resuming the virtual machine and requesting, in due course, the remaining memory pages to be transmitted by the origin host (e.g., responsive to intercepting a page fault with respect to one of the memory pages that has not yet been transferred to the destination host), as described in more detail herein above.

At block 530, the destination hypervisor may retrieve the announcement packets from the guest memory buffer, as described in more detail herein above.

At block 540, the destination hypervisor may broadcast the announcement packets over the network associated with the destination host, in order to trigger the re-configuration of the affected Layer 2 and/or Layer 3 network devices, such as Layer 2 bridges, Layer 3 routers, and other network devices that perform switching, routing, and/or tracking of network packets that are originated by and/or addressed to the migrating virtual machine, as described in more detail herein above.

Responsive to completing operations described with reference to block 530, the method may terminate.

Figure 6:
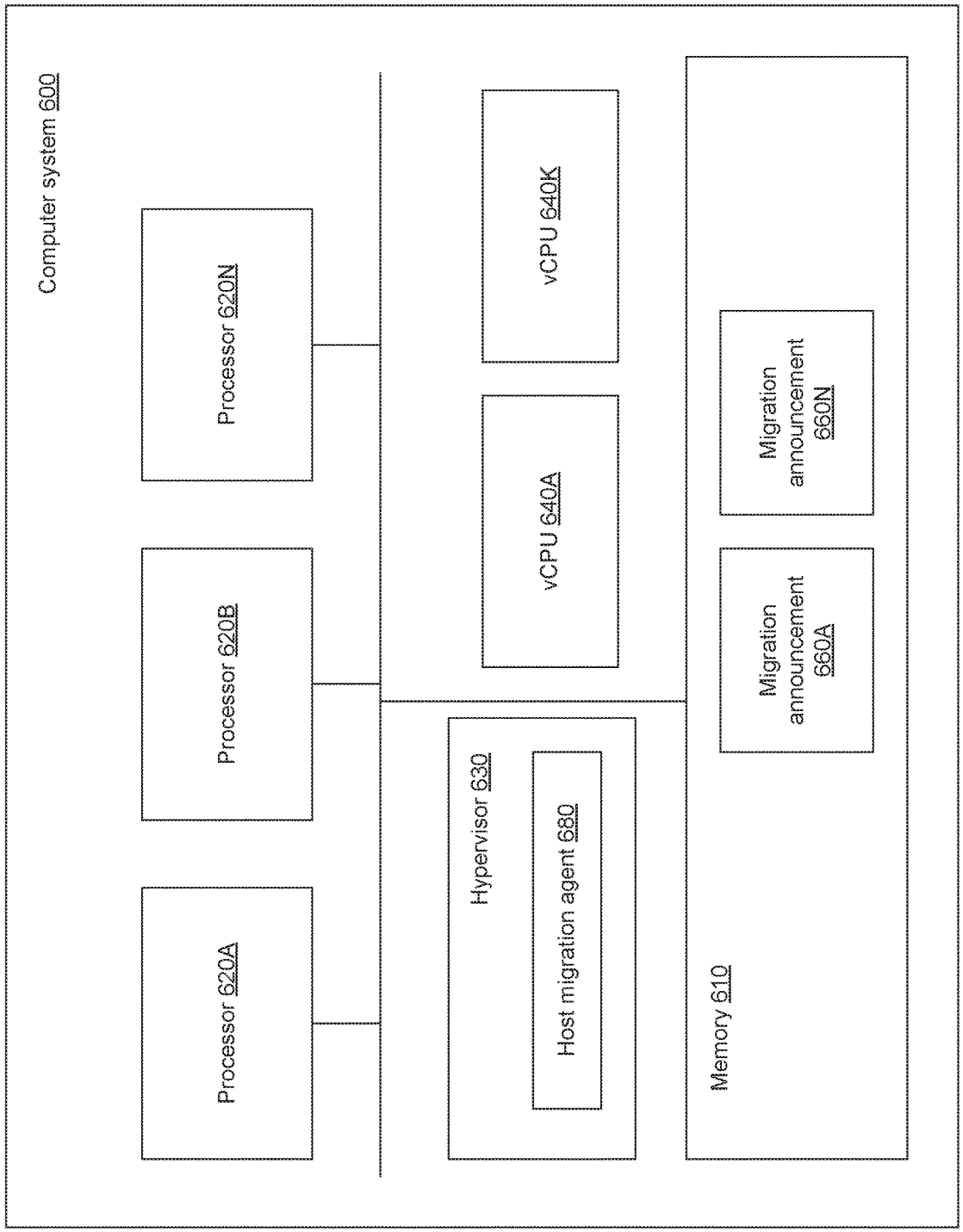
FIGS. 6-7 depict block diagrams of example computer systems operating in accordance with one or more aspects of the present disclosure.

FIG. 6 depicts a block diagram of an illustrative computer system 600 operating in accordance with one or more aspects of the disclosure. In various illustrative examples, the computer system 600 may be represented by the host computer system 100A-100B of FIG. 1. The computer system 600 comprises a memory 610 and one or more physical processors 620A-620N, that are operatively coupled to the memory 610 and execute the code implementing hypervisor 630 and processing threads implementing virtual processors 640A-640K. The memory may store migration announcements 660A-660N prepared by one or more virtual machines that are managed by the hypervisor 630. The hypervisor may include a host migration agent 680 operating in accordance with one or more aspects of the present disclosure. In an illustrative example, the hypervisor 630 may implement methods 400 and/or 500 of FIGS. 4-5.

Figure 7:
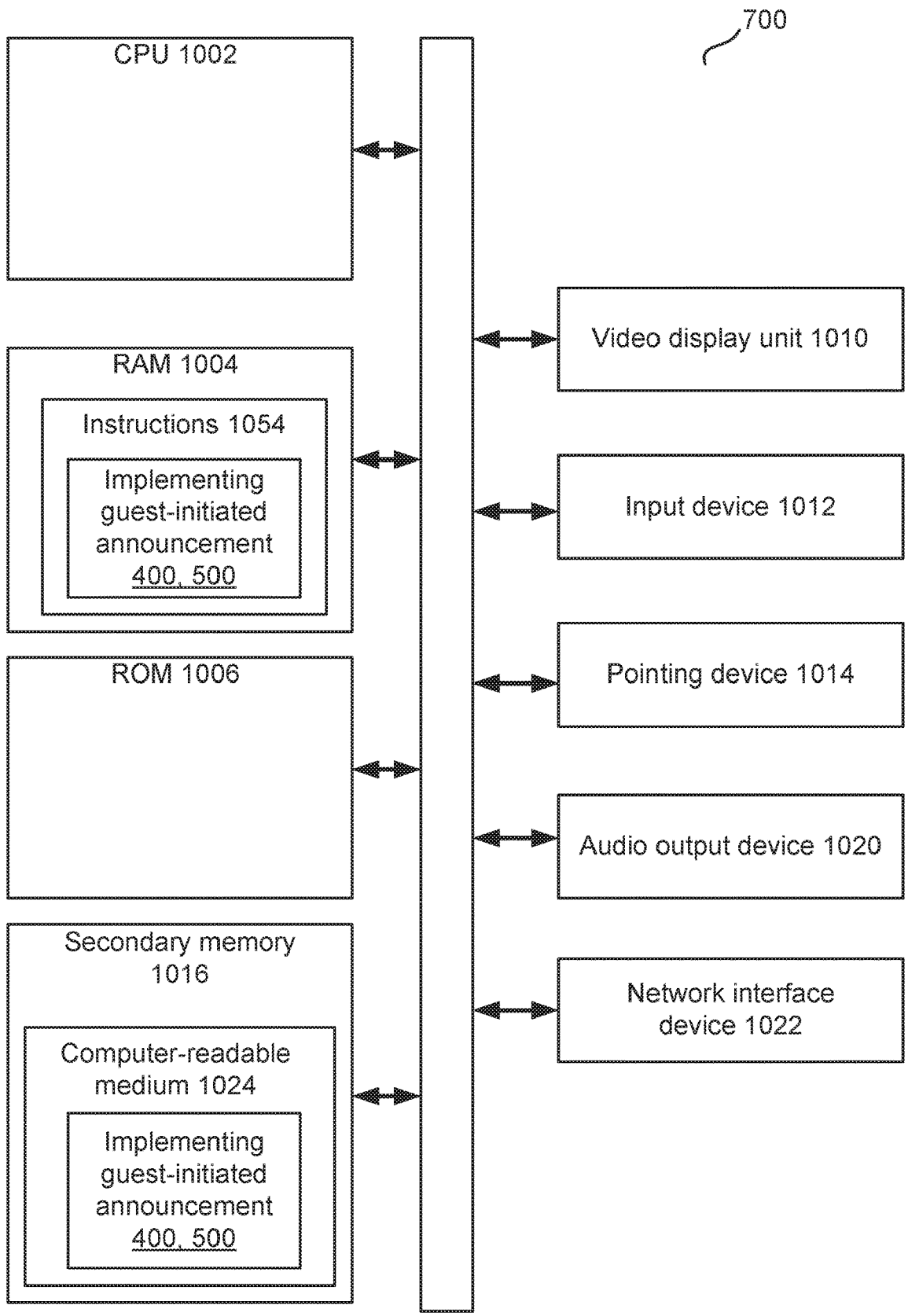

FIG. 7 depicts a block diagram of a computer system operating in accordance with one or more aspects of the present disclosure. In various illustrative examples, computer system 700 may correspond to the host computer system 100A-100B of FIG. 1.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface controller 1022. Computer system 700 also may include a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions 1054 encoding any one or more of the methods or functions described herein, including instructions encoding methods 400 and/or 500 for implementing guest-initiated announcement of virtual machine migration.

Instructions 1054 may also reside, completely or partially, within main memory 1004 and/or within processor 1002 during execution thereof by computer system 700, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
   storing, by a virtual machine running on an origin computer system, a migration announcement in a memory buffer;
   notifying, by the virtual machine, an origin hypervisor running on the origin computer system of an address of the memory buffer;
   updating, by the virtual machine, the migration announcement to reflect modifications of a network configuration of the virtual machine;
   copying, by the origin hypervisor, at least a part of a state of the virtual machine to a destination computer system, wherein the part of the state comprises the memory buffer; and
   responsive to stopping the virtual machine on the origin computer system, causing a destination hypervisor running on the destination computer system to broadcast the migration announcement over a network associated with the destination computer system.

2. The method of claim 1, wherein the memory buffer resides in a memory mapped into an address space of the virtual machine.

3. The method of claim 1, wherein the migration announcement comprises a Layer 2 (data link layer) address associated with a virtual network interface of the virtual machine.

4. The method of claim 1, wherein the migration announcement comprises a Layer 3 (network layer) address associated with a virtual network interface of the virtual machine.

5. The method of claim 1, wherein the migration announcement comprises an identifier of a virtual local area network (VLAN) associated with a virtual network interface of the virtual machine.

6. The method of claim 1, wherein the migration announcement comprises a Reverse Address Resolution Protocol (RARP) message.

7. The method of claim 1, wherein causing the destination hypervisor to broadcast the migration announcement further comprises:
   notifying the destination hypervisor of an address of a memory buffer storing the migration announcement.

8. The method of claim 1, wherein stopping the virtual machine on the origin computer system is performed responsive to determining that a migration convergence condition has been satisfied.

9. The method of claim 1, wherein updating the migration announcement is performed before migration of the virtual machine to the destination computer system is started.

10. The method of claim 1, wherein broadcasting the migration announcement is performed while the virtual machine is blocked during a post-copy migration phase.

11. A computer system, comprising:
    a memory; and
    a processor, coupled to the memory, to:
    cause a virtual machine running on the computer system, to store a migration announcement in a memory buffer;
    cause the virtual machine to notify an origin hypervisor running on the computer system of an address of the memory buffer;
    cause the virtual machine to reflect a modification of a network configuration parameter of the virtual machine by updating the migration announcement;
    cause the origin hypervisor to copy at least a part of a state of the virtual machine to a destination computer system, wherein the part of the state comprises the memory buffer; and cause a destination hypervisor running on the destination computer system to broadcast the migration announcement over a network associated with the destination computer system.

12. The system of claim 11, wherein the memory buffer resides in a memory mapped into an address space of the virtual machine.

13. The system of claim 11, wherein the migration announcement comprises at least one of: a Layer 2 (data link layer) address associated with a virtual network interface of the virtual machine, a Layer 3 (network layer) address associated with a virtual network interface of the virtual machine, or an identifier of a virtual local area network (VLAN) associated with a virtual network interface of the virtual machine.

14. The system of claim 11, wherein the migration announcement comprises a Reverse Address Resolution Protocol (RARP) message.

15. The system of claim 11, further comprising:
causing the destination hypervisor to perform a post-copy migration phase before resuming the virtual machine.

16. A computer-readable non-transitory storage medium comprising executable instructions that, when executed by an origin computer system, cause the origin computer system to:
store, by a virtual machine running on the origin computer system, a migration announcement in a memory buffer;
notify, by the virtual machine, an origin hypervisor running on the origin computer system of an address of the memory buffer;
responsive to detecting a modification of a networking parameter of the virtual machine, update, by the virtual machine, the migration announcement stored in the memory buffer;
copy at least a part of a state of the virtual machine to a destination computer system, wherein the part of the state comprises the memory buffer; and
responsive to stopping the virtual machine on the origin computer system, broadcast the migration announcement over a network associated with the destination computer system.

17. The computer-readable non-transitory storage medium of claim 16, wherein the memory buffer resides in a memory mapped into an address space of the virtual machine.

18. The computer-readable non-transitory storage medium of claim 16, wherein the migration announcement comprises at least one of: a Layer 2 (data link layer) address associated with a virtual network interface of the virtual machine, a Layer 3 (network layer) address associated with a virtual network interface of the virtual machine, or an identifier of a virtual local area network (VLAN) associated with a virtual network interface of the virtual machine.

19. The computer-readable non-transitory storage medium of claim 18, wherein causing the destination hypervisor to broadcast the migration announcement further comprises:
notifying the destination hypervisor of the address of the memory buffer.

20. The computer-readable non-transitory storage medium of claim 18, wherein stopping the virtual machine on the origin computer system is performed responsive to determining that a migration convergence condition has been satisfied.

* * * * *